UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

FINISH-REMOVER.

1,140,449. Specification of Letters Patent. Patented May 25, 1915.

No Drawing. Application filed May 22, 1907. Serial No. 375,014.

*To all whom it may concern:*

Be it known that I, CARLETON ELLIS, a citizen of the United States, and resident of Larchmont, in the county of Westchester and State of New York, have made certain new and useful Inventions Relating to Finish-Removers, of which the following is a specification.

This invention relates to finish removers and relates especially to compositions particularly adapted for the removal of floor waxes and similar finishes.

Volatile alkaline loosening material, such as ammonia, has an energetic softening and loosening action on most floor waxes which contain beeswax, and for this reason finish removers comprising ammonia or similar loosening agents are particularly desirable for use in removing such finishes applied to floors and the like. Where ammonia is used it may be conveniently incorporated with the other remover ingredients by allowing the ammonia gas to percolate through the remover, preferably when in a somewhat chilled condition in a deep tank or other vessel. This action may be continued until the absorption of the ammonia by the remover has substantially ceased. In some cases small quantities of strong ammonia water may be added to the other remover ingredients after their combination and in such cases a small proportion of oleic or other fatty acid may be used or beeswax may be employed in the remover to prevent any separation of the ingredients. Suitable penetrating finish solvent material, that is, solvent material of a generally benzolic character or action in removers may be used in such removers, such as benzol, toluol, xylol, cumene, as well as the corresponding petroleum hydrocarbons, benzin, gasolene, and so forth. Carbon-bisulfid is also a desirable wax solvent and carbon-tetrachlorid and similar chlorinated compounds are useful since they reduce the inflammability of the mixture. With some wax and other finishes, such as paints and varnishes, loosening finish solvent material, that is, finish solvent material of a generally alcoholic character or action in removers are desirable, including the strict alcohols such as methyl ethyl, propyl, butyl, amyl and benzyl alcohols which are preferably used in their commercial forms for the sake of cheapness, including denatured alcohol and other solvents of a generally alcoholic character or action, such as acetone and other ketones, acetone oil, light tar oil, resin oil, and so forth, composite solvents being usually more desirable and having a better generally solvent action in removers.

Although not necessary in all cases it is usually desirable to employ suitable stiffening material in the remover, such as wood flour, starch, whiting, infusorial earth and soapy or waxy bodies, such as ceresin, paraffin, bayberry tallow, beeswax, ozocerite, oleic and other fatty acids, palm oil and nitrocellulose may also be used, many of which form effective evaporation retarding films over the exposed surface of the remover when in use.

A typical illustrative type of remover of this character may comprise benzol 13 gallons, wood alcohol 12 gallons, beeswax 3 pounds, suitably combined in the usual way, preferably by agitation at slight increase of temperature and then saturated with ammonia gas by allowing the gas to percolate through the chilled remover in a suitable tank. Another illustrative composition may comprise benzol 15 gallons, acetone 10 gallons, which may be used in the form of methyl acetone, if desired, paraffin wax 4 pounds, oleic acid ½ pound combined as indicated and two quarts of 26° ammonia thoroughly incorporated therewith.

This invention has been described in connection with a number of illustrative ingredients, formulas, proportions and processes, to the details of which disclosure the invention is not, of course, to be limited.

What is claimed is:—

1. The finish remover formed by incorporating approximately benzol 15 gallons, methyl acetone 10 gallons, paraffin wax 4 pounds, oleic acid ½ pound and 26-degrees ammonia 2 quarts.

2. The finish remover formed by incorporating substantially as described benzol 15 gallons, loosening finish solvent material 10 gallons, oleaginous thickening material and 2 quarts of ammonia water of about 26° strength.

3. The substantially fluent finish remover consisting substantially of composite volatile energetic finish solvent material and formed by incorporating penetrating and loosening finish solvent material, waxy stiffening material and ammonia.

CARLETON ELLIS.

Witnesses:
HARRY L. DUNCAN,
JESSIE B. KAY.